(12) United States Patent
Pinkerton et al.

(10) Patent No.: US 10,266,970 B2
(45) Date of Patent: Apr. 23, 2019

(54) CONCRETE REINFORCING FIBERS

(75) Inventors: Luke Pinkerton, Ann Arbor, MI (US);
Joseph L. Stecher, Grand Rapids, MI (US)

(73) Assignee: Pensmore Reinforcement Technologies, LLC, Ann Arbor, MI (US)

(*) Notice: Subject to any disclaimer, the term of this patent is extended or adjusted under 35 U.S.C. 154(b) by 930 days.

(21) Appl. No.: 14/390,270

(22) PCT Filed: Sep. 14, 2012

(86) PCT No.: PCT/US2012/055567
§ 371 (c)(1),
(2), (4) Date: Jan. 14, 2015

(87) PCT Pub. No.: WO2013/151580
PCT Pub. Date: Oct. 10, 2013

(65) Prior Publication Data
US 2015/0184318 A1    Jul. 2, 2015

Related U.S. Application Data

(60) Provisional application No. 61/619,466, filed on Apr. 3, 2012.

(51) Int. Cl.
| | | |
|---|---|---|
| C04B 22/04 | (2006.01) |
| C04B 14/48 | (2006.01) |
| D02G 3/12 | (2006.01) |
| E04C 5/01 | (2006.01) |
| B21F 5/00 | (2006.01) |
| B21F 7/00 | (2006.01) |
| B21F 11/00 | (2006.01) |
| B21F 45/00 | (2006.01) |

(Continued)

(52) U.S. Cl.
CPC ............... *D02G 3/12* (2013.01); *B21F 5/00* (2013.01); *B21F 7/00* (2013.01); *B21F 11/00* (2013.01); *B21F 45/006* (2013.01); *C04B 14/48* (2013.01); *E04C 5/012* (2013.01); *D10B 2101/20* (2013.01); *D10B 2505/02* (2013.01); *Y10T 428/12* (2015.01)

(58) Field of Classification Search
None
See application file for complete search history.

(56) References Cited

U.S. PATENT DOCUMENTS

| | | |
|---|---|---|
| 2,216,758 A | 10/1940 | Schmidt |
| 2,217,301 A | 10/1940 | Wennberg |

(Continued)

FOREIGN PATENT DOCUMENTS

KR    10-2009-0010734    1/2009

OTHER PUBLICATIONS

United States Patent Office, International Search Report for PCT/US2012/055567, dated Nov. 27, 2012, 1 page.

*Primary Examiner* — James E McDonough
(74) *Attorney, Agent, or Firm* — Brinks Gilson & Lione

(57) ABSTRACT

A method of making a fiber (100) that includes continuously receiving a round wire (10), forming the round wire into a fiber having to have a cross-sectional shape defining a truncated circle having an aspect ratio of between 1.53 and 1.88, and simultaneously pulling and twisting the fiber a threshold number of twists per inch while retaining the aspect ratio of the fiber.

22 Claims, 10 Drawing Sheets

(51) Int. Cl.
*C04B 7/00* (2006.01)
*C04B 7/34* (2006.01)
*C04B 28/00* (2006.01)
*C04B 32/00* (2006.01)
*C04B 16/00* (2006.01)

(56) References Cited

U.S. PATENT DOCUMENTS

| | | | |
|---|---|---|---|
| 2,256,060 A | | 9/1941 | Stites |
| 4,560,622 A | * | 12/1985 | Tezuka .................... B23P 17/06 106/644 |
| 4,804,585 A | * | 2/1989 | Tani ........................ E04C 5/012 106/644 |
| 6,340,522 B1 | * | 1/2002 | Burke ..................... E04C 5/012 428/359 |
| 8,044,139 B2 | | 10/2011 | Youn et al. |

\* cited by examiner

CONCRETE REINFORCING FIBERS

CROSS REFERENCE TO RELATED APPLICATIONS

This application is a § 371 national stage application of International Application No. PCT/US2012/055567 filed on Sep. 14, 2012, which claims priority to U.S. Provisional Application No. 61/619,466 filed on Apr. 3, 2012, the entire contents each of which are hereby incorporated by reference.

TECHNICAL FIELD

This disclosure relates to concrete reinforcing fibers.

BACKGROUND

Concrete generally exhibits a low tensile strength and low fracture toughness. The ease with which cracks can nucleate and propagate in concrete under tension makes it imperative that concrete not be loaded in tension to the extent possible, and if unavoidable, some form of traditional reinforcement, such as rebar, is ordinarily provided to take the tensile stresses. The latter is generally known as reinforced concrete.

An alternate method of reinforcement is by incorporating short, randomly distributed fibers in concrete such that the reinforcing fibers are distributed throughout the matrix and thus a new composite material, such as fiber reinforced concrete, is obtained. Fiber reinforced concrete has significantly improved energy absorption capability (often called toughness), impact resistance, and fatigue endurance, with greater resistance to cracking. It can also have better durability with an improved appearance.

Concrete has been reinforced with metal, steel and polymer fibers, in some cases strengthening the concrete and even making it blast resistant. Thread-like elements (fibers) of steel wire having uniform corrugations along their entire length have been used for the reinforcement of concrete. Typically steel fibers can be found in different forms: round (cut from wire), flat (sheared from steel sheets), and irregularly shaped from melt. Mechanical deformations such as crimping, adding hooks or paddles at their ends, or roughening their surface sometimes increases the bonding of fiber to matrix.

A significant problem that remains is an efficient and low cost method to manufacture the fibers used in these composites. Current methods are complex and the resultant products relatively costly. Excessive material cost can result in poor reinforcing efficiencies because of the perceived cost to benefit ratio. Accordingly, there is a need for improved fibers and their method of manufacture in order to improve the manufacture of reinforced cement, ceramic, and polymeric based composites. There is also a need for methods of manufacturing fibers having improved geometries at a reduced cost. Fibers with optimized geometry can improve the pull-out load of the fiber, the stress-strain response of the composite under various loadings, and the energy absorbing capacity of the composite. The fibers disclosed here satisfy these needs at a significantly lower cost than is currently available.

SUMMARY

The present disclosure provides a concrete reinforcing fiber defining a geometry for reinforcing a matrix such as cement-based composites produced by cost-effective manufacturing methods. The disclosure also provides concrete and like materials, as well as a method for the manufacture of both the materials to make the concrete matrix and the improved concrete matrix itself that has improved crack resistance, impact capacity, and shatter resistance.

One aspect of the disclosure provides a fiber having a body defining a longitudinal axis and having a cross section in the shape of a truncated circle, where the truncated circle has an aspect ratio between 1.53 and 1.93. The aspect ratio is a ratio of width to thickness of the body.

Another aspect of the disclosure provides a composite structure including a matrix material (e.g., cement or a polymeric based material) and a fiber having a body defining a longitudinal axis and having a cross section in the shape of a truncated circle, where the truncated circle has an aspect ratio between 1.53 and 1.93. The aspect ratio is a ratio of width to thickness of the body.

Implementations of the disclosure may include one or more of the following features. In some implementations, the fibers may reinforce cement, ceramic and polymeric based composites to provide a higher bond surface per unit cross-sectional area or per unit volume of fiber used. Typical polygonal, flat, or rectangular reinforcement fibers can cause tunneling which can lead to poor adhesion of the matrix to the fiber resulting in a composite or matrix having pores and weak points. Twisted fibers having a rectangular, triangular or square cross section are often better at making a matrix or composite such as concrete stronger than can be made using round fibers. Round fibers can pull out of the matrix under much lighter loads than will triangular or square shaped fibers. Fibers having a cross-sectional shape defining a bilateral truncated circle can be cheaper to make and yet perform at the same or in a superior manner to reinforcement fibers having known geometry such as rectangles. The fibers define an efficient geometry and can be twisted and used in concrete with minimal tunneling to provide for a relatively denser (or less porous) transition zone and thus a relatively stronger bond between the fiber and the matrix, which offers enhanced properties to the composition.

The bilateral truncated circular fibers may be used to reinforce cement and ceramic based matrices as well as all types of matrices. A manufacturing cost of the bilateral truncated circular fibers is lower than that of traditional rectangular fibers. Moreover, the bilateral truncated circular fibers provide superior results to round fibers, which generally result in a weak matrix that displays fiber pull-out instead of fiber failure at higher loads. When the fibers pull out of the matrix instead of breaking, the matrix (e.g., a concrete matrix) becomes weaker than if the fibers stayed in place until breaking. The bilateral truncated circular fiber pulls out instead of breaking out under high loads and strains. The primary applications of these fibers are in reinforced and/or pre-stressed concrete structures.

In some implementations, the aspect ratio is 1.72 or 1.73. Moreover, the aspect ratio may be selected from any one or a combination of the following ranges and values: a) 1.53-1.93; b) 1.53-1.88; c) 1.53-1.83; d) 1.53-1.78; e) 1.53-1.73, f) 1.53-1.68, g) 1.53-1.63; h) 1.53-1.58; i) about 1.53; j) 1.58-1.93; k) 1.58-1.88; l) 1.58-1.83; m) 1.58-1.78; n) 1.58-1.73; o) 1.58-1.68; p) 1.58-1.63; q) 1.58-1.53; r) about 1.58; s) 1.63-1.93; t) 1.63-1.88; u) 1.63-1.83; v) 1.63-1.78; w) 1.63-1.73; x) 1.63-1.68; y) 1.63-1.58; z) 1.63-1.53; aa) about 1.63; bb) 1.68-1.93; cc) 1.68-1.88; dd) 1.68-1.83, ee) 1.68-1.78; ff) 1.68-1.73; gg) 1.68-1.63; hh) 1.68-1.58; ii) 1.68-1.53; jj) about 1.68; kk) 1.73-1.93; ll) 1.73-1.88; mm) 1.73-1.83; nn) 1.73-1.78; oo) 1.73-1.68; pp) 1.73-1.63: qq) 1.73-1.58; rr) 1.73-1.53; ss) about 1.73); tt) 1.78-1.93; uu)

1.78-1.88; vv) 1.78-1.83; ww) 1.78-1.73; xx) 1.78-1.68; yy) 1.78-1.63; zz) 1.78-1.58; aaa) 1.78-1.53; bbb) about 1.78; ccc) 1.83-1.93; ddd) 1.83-1.88; eee) 1.83-1.78; fff) 1.83-1.73; ggg) 1.83-1.68; hhh) 1.83-1.63; iii) 1.83-1.58; jjj) 1.83-1.53; kkk) about 1.88; lll) 1.88-1.93; mmm) 1.88-1.83; nnn) 1.88-1.78; ooo) 1.88-1.73; ppp) 1.88-1.68; qqq) 1.88-1.63; rrr) 1.88-1.58; sss) 1.88-1.53; ttt) about 1.88; uuu) about 1.93.

The body of the concrete reinforcing fiber may be twisted along its longitudinal axis, for example, between 3 and 4 twists along its longitudinal axis per every length of between 20 mm and 40 mm, such as 25 mm or 32 mm. Each twist may include a rotation a first end of the body relative to a second end of the body of between 180 degrees and 360 degrees. In some examples, the body has a width of between 0.01375 inches and 0.0159 inches.

Another aspect of the disclosure provides a method of making a reinforcing fiber having a cross section that is in the shape of a bilateral truncated circle, where the fiber has any of the aspect ratios noted above, and the fiber is made by passing a round wire through roller bearings under sufficient force to produce a fiber defining a bilateral truncated circle cross sectional shape. The method may include simultaneously pulling and twisting the fiber a threshold number of twists per inch while retaining the aspect ratio. The wire may have a diameter of 0.51 mm.

Yet another aspect of the disclosure provides a method of making a reinforcing fiber that includes continuously receiving a round wire, forming the round wire into a fiber having to have a cross-sectional shape defining a truncated circle having an aspect ratio of between 1.53 and 1.88. The aspect ratio is a ratio of width to thickness of the fiber. The method includes simultaneously pulling and twisting the fiber a threshold number of twists per inch while retaining the aspect ratio of the fiber.

In some implementations, the method includes twisting the fiber between 3 and 4 twists along its longitudinal axis per every length of between 20 mm and 40 mm, such as 25 mm or 32 mm. For each twist, the method may include rotating a first end of a body the fiber relative to a second end of the body of between 180 degrees and 360 degrees. The method may include cutting the twisted fiber to a threshold length free of holding the twisted fiber (i.e., while not holding the twisted fiber at all, or near the cut ends of the fiber). The method may include receiving and cutting the twisted fiber to a threshold length (e.g., between 20 mm and 40 mm, such 25 mm or 32 mm) while retaining the aspect ratio of the fiber. In some examples, the method includes forming the round wire into a fiber having to have a cross-sectional shape defining a truncated circle having a width of between 0.01375 inches and 0.0159 inches.

Another aspect of the disclosure provides a composite structure including a matrix material and a fiber that includes a body defining a longitudinal axis and having a cross section in the shape of a truncated circle. The truncated circle has an aspect ratio between 1.53 and 1.93. The aspect ratio is a ratio of width (w) to thickness (t) of the body.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
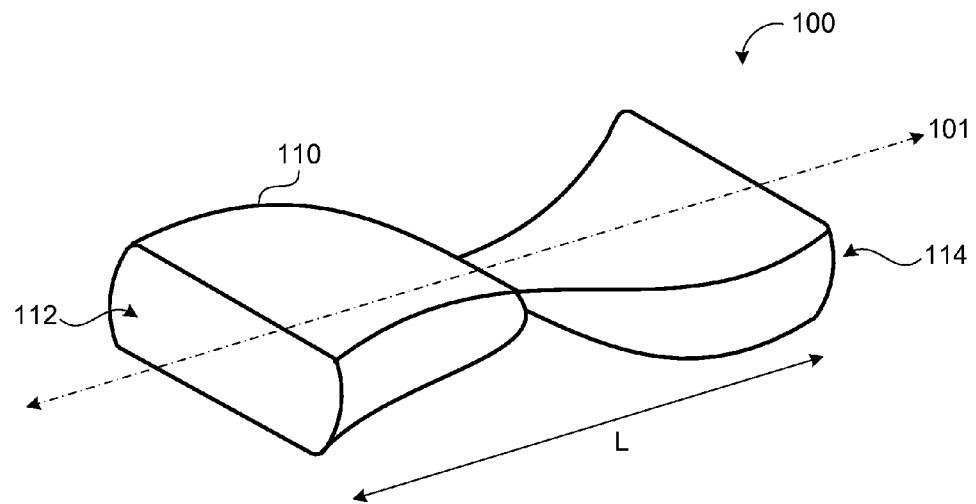
FIG. 1A is a perspective view of an exemplary twisted fiber.
Figure 1B:
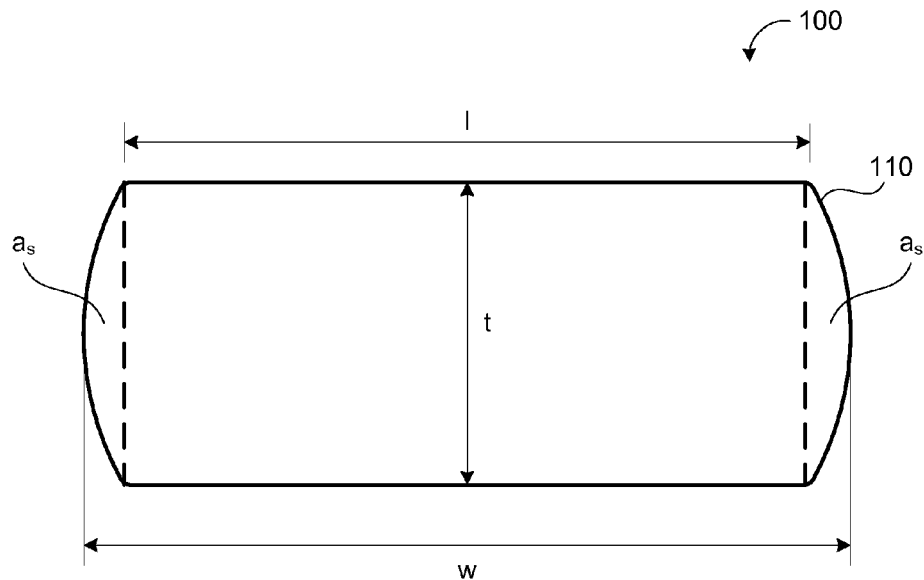
FIG. 1B shows a cross section of fiber after processing according to this disclosure which shows a bilateral truncated circle where "w" is the overall width (end to end) of the rounded ends of the bilateral truncated circle and "t" is the thickness or distance between the two flattened sides of the bilateral truncated circle.

"Aspect ratio" means the ratio of lengths "w" to "t" as shown in FIG. 1B. The length "w" is the overall length of the bilateral truncated circle, as shown FIG. 1B. The "t" dimension is the thickness or distance between the two straight line sides of the bilateral truncated circle, as shown in FIG. 1B. The "w" length is usually longer than the "t" dimension, as shown and described herein.

"Bilateral truncated circle" refers to a shape somewhat like a rectangle only with two opposing flat sides and rounded sides, it may be thought of as a rectangle with two rounded opposite end. See FIG. 1B.

"Fiber" can be any material with a length longer than its width. Specifically, fiber can be made of any metal or metal alloy including steel, iron, aluminum, copper, nickel and any alloys or combinations thereof. Steel and alloys of steel with other metals such as nickel and minerals and additives such as carbon are preferred. Fiber either alone or when treated can be made of natural origin materials such as for example cotton, silk, wool, cellulose, rubber, and combinations thereof; in addition it can be composed of synthetic polymers such as for example polycarbonate, polyurethane, polyethylene, Teflon and combinations thereof and/or any combination of metals, natural fibers and synthetic products or polymers.

"Ideal rectangular geometry" is a regular rectangle, with four (4) sides, the two (2) opposite sides have the same length and all sides are connected with right angles.

Referring to FIGS. 1A and 18, in some implementations, discontinuous fibers 100 may have a body 110 defining a longitudinal axis 101 and having geometric cross section defining a bilateral truncated circle. Fiber or wire 100 shaped into a bilateral truncated circle with an aspect ratio between about 1.53 and about 1.93 (e.g., about 1.73) can be used to make reinforced matrix material such as concrete just as well or better as rectangular shaped wire of similar dimension and it costs less to manufacture. The body 110 of the fiber 100 may have a length L of between 20 mm and 40 mm, such as 25 mm or 32 mm, and a width w of between 0.01375 inches and 0.0159 inches. The thickness t is the width w times the aspect ratio. The fiber body 110 may be twisted along its longitudinal axis 101 by 1-6 times (e.g., 3 or 4 times), where each twists includes rotating a first end 112 of the body 110 relative to a second end 114 of the body 110 by between 180° and 360°. It can also have, in addition to an added twisting configuration, other mechanical deformations such as crimping or hooked ends, to further develop the mechanical component of bond and thus improve overall performance.

Sometimes concrete reinforced with fibers with aspect ratios less than 1.5 begin to fail because the fibers pull out of the concrete suddenly rather than untwisting and pulling out in a controlled manner. Fibers with aspect ratios less than 1.5 can experience this failure mechanism. Fibers 100 with a higher aspect ratio on the other hand can be expensive and difficult to make. They can also be the subject of "tunneling" which decreases the bond between fiber and matrix. Fibers 100 having a bilateral truncated circle cross-sectional shape with an aspect ratio greater than 1.5 avoids the failure mechanism of "pull out," but because of an aspect ratio of less than 2.0, exhibits optimized strength and low cost of manufacture.

The aspect ratio of 1.73, about 1.73, and the following ranges: 1.72-1.74, 1.71-1.75, 1.70-1.76, 1.69-1.77 and 1.68-1.78 exhibit relatively high strength and allow ease of manufacture. Additionally or alternatively, the following aspect ratios may be used:

a) 1.53-1.93; b) 1.53-1.88; c) 1.53-1.83; d) 1.53-1.78; e) 1.53-1.73, f) 1.53-1.68, g) 1.53-1.63; h) 1.53-1.58; i) about 1.53; j) 1.58-1.93; k) 1.58-1.88; l) 1.58-1.83; m) 1.58-1.78; n) 1.58-1.73; o) 1.58-1.68; p) 1.58-1.63; q) 1.58-1.53; r) about 1.58; s) 1.63-1.93; t) 1.63-1.88; u) 1.63-1.83; v) 1.63-1.78; w) 1.63-1.73; x) 1.63-1.68; y) 1.63-1.58; z) 1.63-1.53:

aa) about 1.63; bb) 1.68-1.93; cc) 1.68-1.88; dd) 1.68-1.83, ee) 1.68-1.78; ff) 1.68-1.73; gg) 1.68-1.63; hh) 1.68-1.58; ii) 1.68-1.53; jj) about 1.68; kk) 1.73-1.93; 11) 1.73-1.88; mm) 1.73-1.83; nn) 1.73-1.78; oo) 1.73-1.68; pp) 1.73-1.63: qq) 1.73-1.58; rr) 1.73-1.53]; ss) about 1.73); tt) 1.78-1.93; uu) 1.78-1.88; vv) 1.78-1.83; ww) 1.78-1.73; xx) 1.78-1.68; yy) 1.78-1.63; zz) 1.78-1.58; aaa) 1.78-1.53; bbb) about 1.78; ccc) 1.83-1.93; ddd) 1.83-1.88; eee)]1.83-1.78; fff) 1.83-1.73; ggg) 1.83-1.68; hhh) 1.83-1.63; iii) 1.83-1.58; jjj) 1.83-1.53; kkk) about 1.88; 111) 1.88-1.93; mmm) 1.88-1.83; nnn) 1.88-1.78; 000) 1.88-1.73; ppp) 1.88-1.68; qqq) 1.88-1.63; rrr) 1.88-1.58; sss) 1.88-1.53; ttt) about 1.88; uuu) about 1.93.

The fibers 100 may reinforce a matric material 202 (FIG. 9A), such as concrete, cement, ceramic and polymeric based composites. The cross-sections of the fibers 100 may define a bilateral truncated circular shape. The cross sections of the fibers 100 have been optimized to have an aspect ratio of greater than 1.5 and less than 2. Aspect ratios greater than 1.5 avoid the failure mechanism where the fibers are pulled out of the concrete suddenly when the fiber-reinforced concrete is subjected to a stress. Aspect ratios less than 2 show increased strength in concrete as compared to higher aspect ratios and they have the superior advantage of a lower cost of manufacture.

Figure 2:
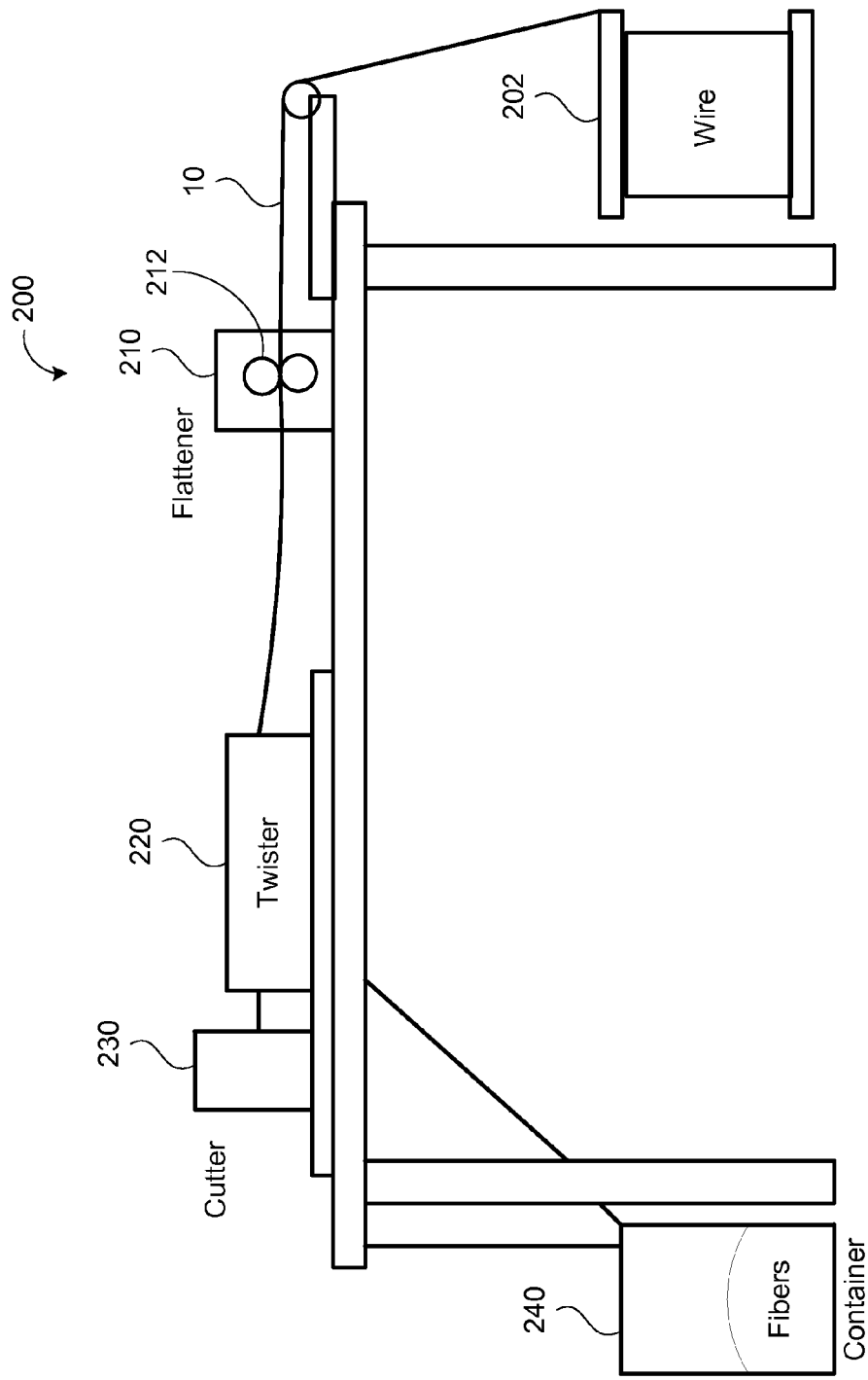
FIG. 2 is a schematic view of an exemplary process for manufacturing fibers defining a bilateral truncated circular shape.
Figure 3:
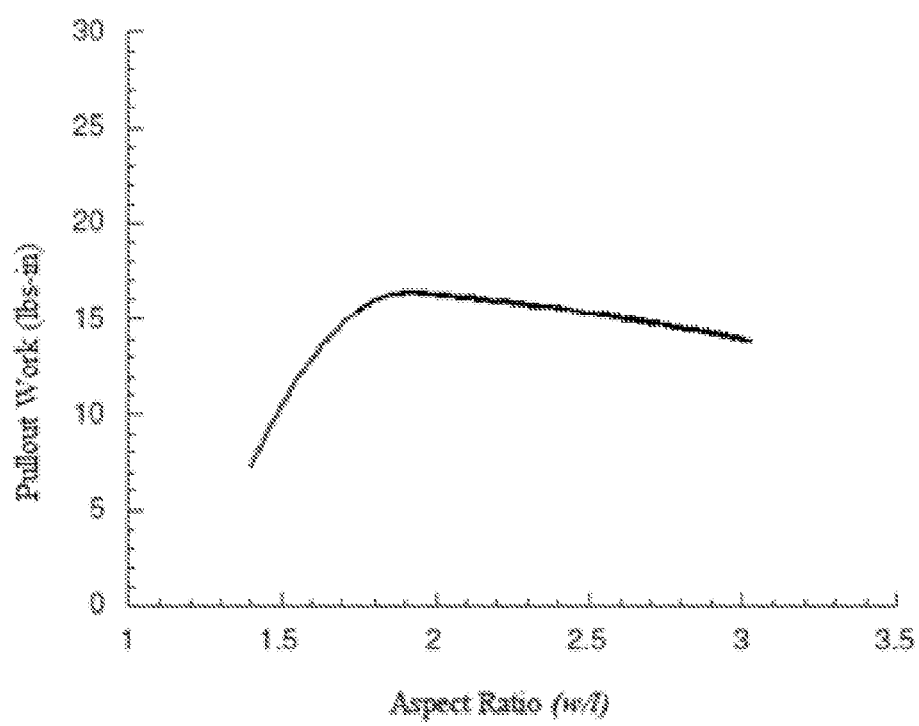
FIG. 3 is a chart illustrating pullout effort versus aspect ratio for concrete.

FIG. 2 illustrates a system 200 for producing short segments of twisted fiber 100 having a cross section in the shape of a bilateral truncated circle. The advantage of a relatively lower cost of manufacture is associated with the geometry of the bilateral truncated circle. A flattener 210 receives a continuously fed round or circular wire or fiber 10, such as a metal wire, shaping the wire in one continuous operation. The wire 10 may have a diameter of between 0.45 mm and 0.57 mm, such as 0.51 mm. In some implementations, the flattener 210 is a bearing mounted flattening device having multiple bearings 212. As the wire 10 passes through the flattener 210 it is transformed into wire 100 with a cross section in the shape of a bilateral truncated circle, as shown in FIG. 1B. This product, the processed fiber 100, has two flat or straight sides but remains curved on the other opposing sides. The aspect ratio of the bilateral truncated circle will vary depending on the composition of the fiber and the force applied to the fiber, through the roller bears, in order to flatten the wire. There is a dramatic change in the life of the bearings that is directly related to the force applied to the roller bearings in order to shape the wire to a specified aspect ratio. See FIGS. 3 and 4. Surprisingly there is a relatively narrow range of shapes that can be formed that have both excellent pull out properties and the ability to be formed with relatively little damage to the roller bearings that form the shape of the fiber.

Figure 4:
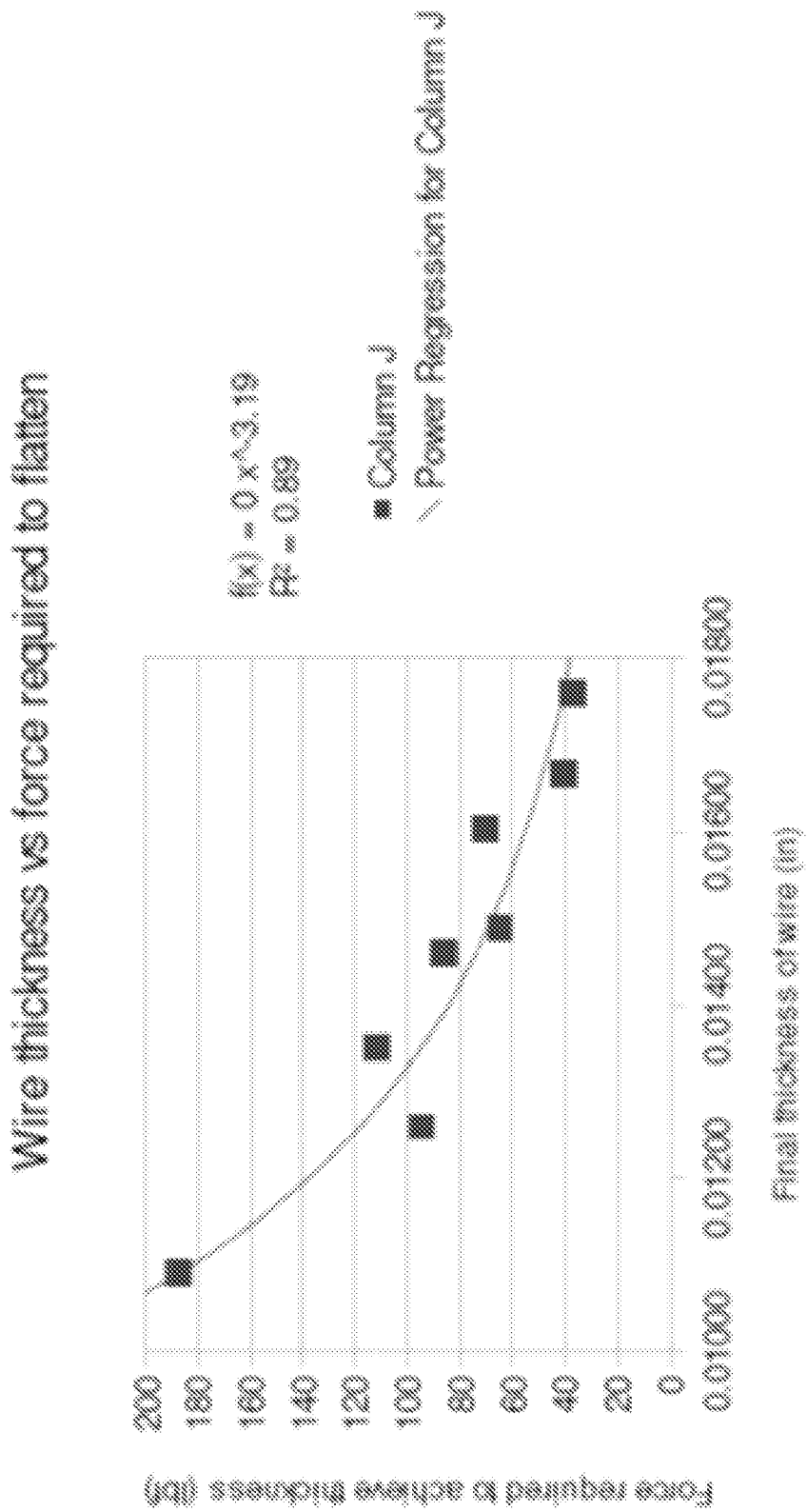
FIG. 4 is a chart illustrating forces needed to produce a bilateral truncated circle shaped fiber to different aspect ratios.
Figure 5:
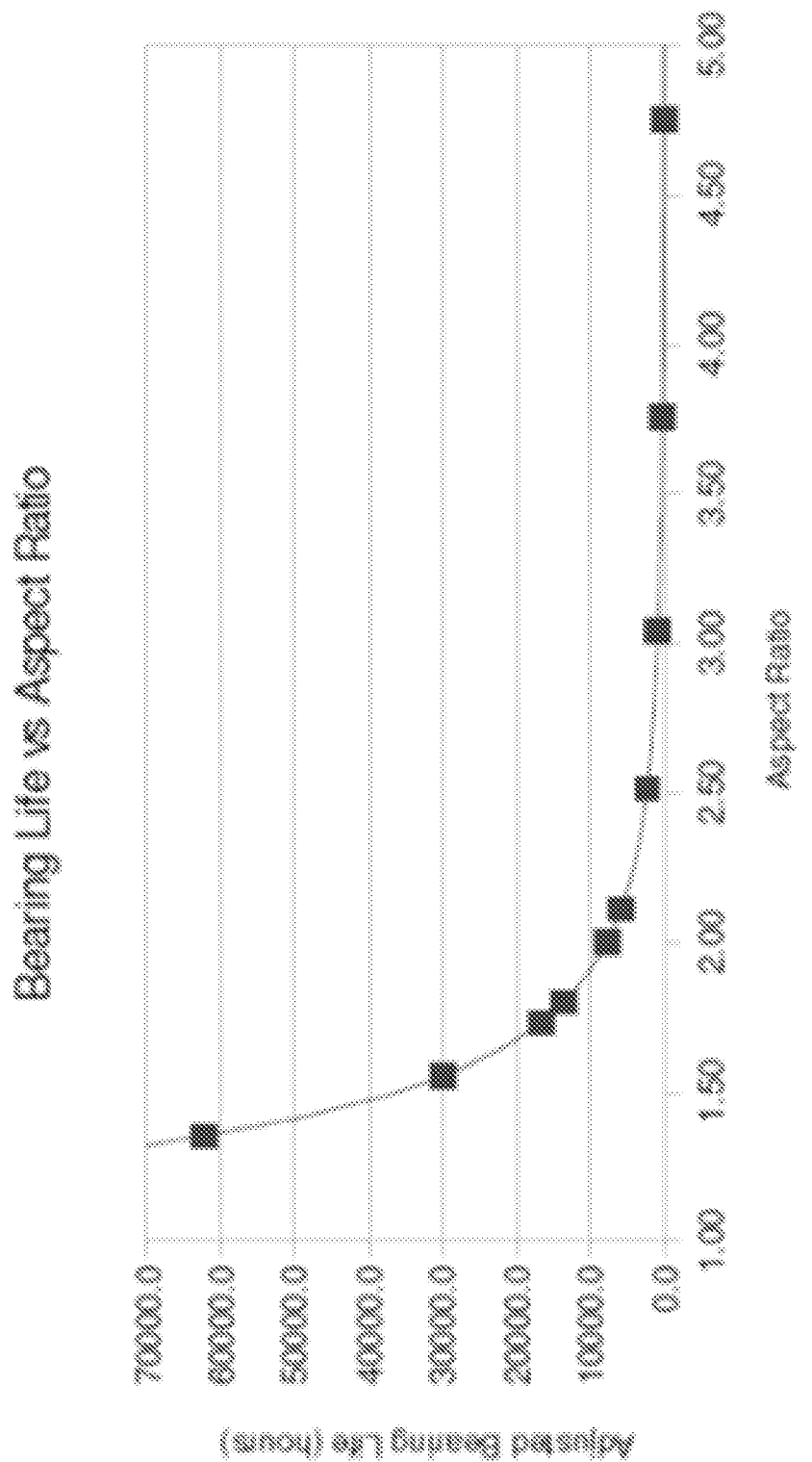
FIG. 5 is a chart illustrating useful bearing life versus aspect ratios of bilateral truncated circular shaped wire.

In some implementations, fibers 100 with aspect ratios between about 1.53 and about 1.93 (e.g., about 1.73) can be used that have both excellent pull out properties and can be made with relatively little damage to the roller bearings used to make the shapes. We believe fibers 100 with aspect ratios of 1.73, 1.72-1.74, 1.71-1.75, 1.70-1.76, 1.69-1.77 and 1.68-1.78, formed into the bilateral truncated circle profile to be most highly preferred and the other ranges noted herein are highly acceptable. FIG. 4 shows the force required to flatten the wire 10 to various thicknesses. FIG. 5 shows the bearing life as a function of the aspect ratio. Bearing life is influenced in a non-linear way by the load on the bearings. A change from an aspect ratio of 2 to an aspect ratio of 1.73 results in a 114% increase in bearing life. The cost savings of such an increase in bearing life as a result of producing fibers with an aspect ratio of 1.73 instead of 2 is great. Cost savings for producing fibers 100 with aspect ratios less than 1.50 are outweighed by the issues associated with the failure mechanism previously discussed. In some implementations, an aspect ratio for the cross-section of the fibers 100 is 1.73, which provides a relatively high strength at the lowest production cost without running the risk of failure.

In some implementations, the fiber 100 has a cross section in the shape of a truncated circle where the truncated circle has an aspect ratio between 1.53 and 1.93, and more specifically a fiber 100 with an aspect ratio of 1.73 or about 1.73. The fiber 100 can be made of any metal, such as steel and have any of the aspect ratios as described herein.

Figure 6:
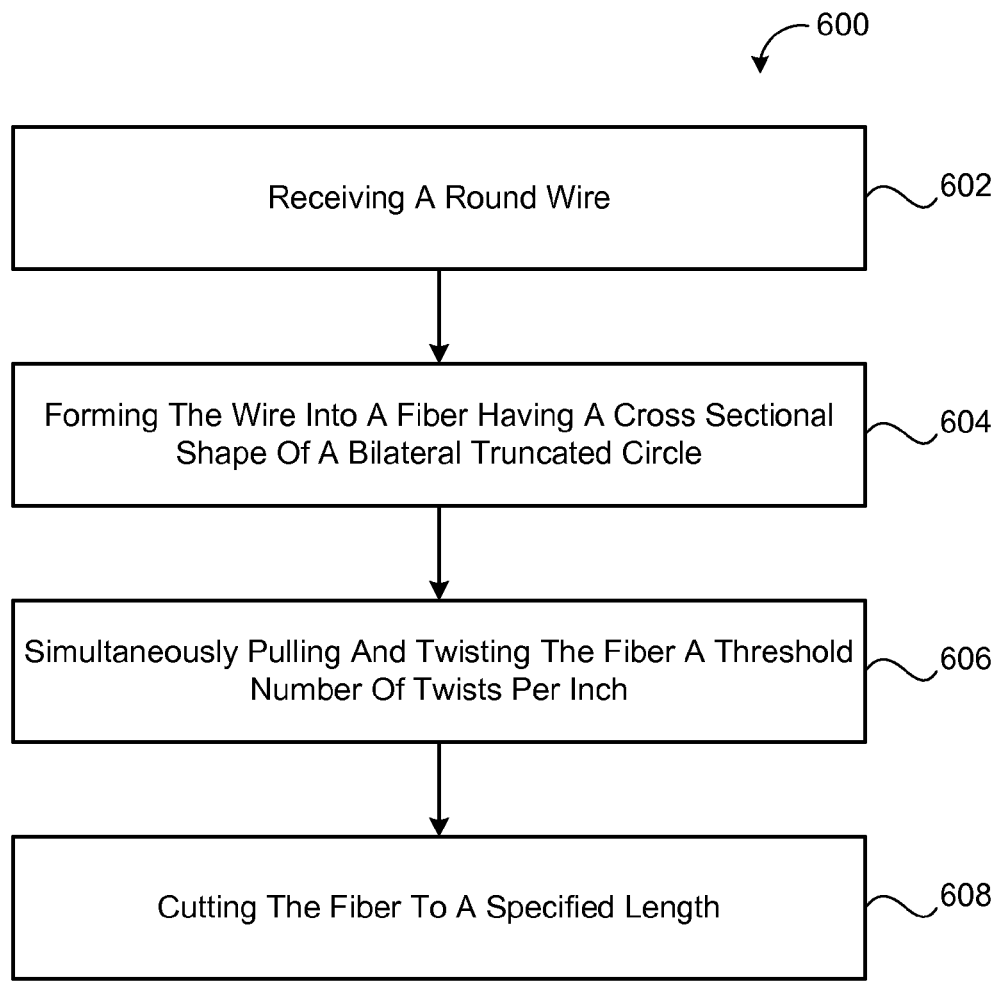
FIG. 6 provides an exemplary arrangement of operations for a method of manufacturing the fiber.

FIG. 6 provides an exemplary arrangement of operations for a method of manufacturing the fiber 100. The method include receiving 602 a round wire 10 (e.g., through a flattener 210) and forming 604 the wire 10 into a fiber 100 having a cross sectional shape of a bilateral truncated circle and any of the aspect ratios as described herein. The flattener 210 may include roller bearings 212 that exert sufficient forces to produce the fiber 100 with a bilateral truncated circle cross sectional shape. For example, the method may include feeding a continuous spool of round wire 10 into and through a set of roller bearings 212 that are capable to shaping the wire 10 into the shape of a truncated circle cross sectional shape with an aspect ratio of between 1.53 and 1.93.

The method further includes simultaneously pulling and twisting 606 the fiber 100 a threshold number of twists per inch (e.g., 3-4 twists of 180° to 360° per every length L of between 20 mm and 40 mm, such as 25 mm or 32 mm) while retaining the aspect ratio of the fiber 100. The method may include cutting 608 the fiber 100 to a specified length L. For example, the method may include continuously sending the fiber 100 into a cutter 230 that measures and cuts the fiber 100 to the specified length.

The bilateral truncated circle cross-section when compared to the regular rectangular geometry of the cross section of the fibers 100 produces a significant cost savings. The substantial added cost from additional processing, machining, and labor needed in order to produce a regular rectangular geometry does not result in a proportional increase in performance.

Generally, fibers 100 having a flat cross-section are harder to mix than fibers 100 having a compact cross-section. Flat twisted fibers 100 when mixed in a matrix often form tunnel-like segments that trap air. These air filled tunnels are not penetrated by the matrix and this can result in poorly bonded fibers 100 that are more prone to crack initiation than are more fully bonded fibers 100.

The optimized cross-sectional geometries presented here are easily amenable to twisting and to creating a product having mechanical surface deformations that are so very effective in improving bond matrix but without the undesired property of being prone to tunneling. In adding to being easily twisted into an improved shape the fibers 100 can also undergo other mechanical deformations such as by crimping or the addition of various anchorages such as hooked ends, paddle ends, button ends, and enlarged ends among other things to further improve performance.

The geometry of the bilateral truncated circle cross section can be approximated by assuming that the radius of the curved area remains the same as the original radius of the circular cross section. Given a wire with a circular cross-section with an initial radius, r, that is processed through the devices described herein to produce a fiber 100 with a bilateral truncated circle cross section with thickness, t, the area of the circular segment on either end of the bilateral truncated circle can be calculated using the following equation.

$$a_s = r^2 \arcsin\left(\frac{t}{2r}\right) - \frac{t}{2}\sqrt{r^2 - \frac{t^2}{4}} \quad (1)$$

The areas of the two circular segments are then subtracted from the original area of the wire and divided by t to get the straight leg length, l, of the bilateral truncated circle.

$$l = \frac{(a - 2a_s)}{t} \quad (2)$$

The overall width, w, is then calculated using the equation for the height of a circular sector and adding the heights of the two circular segments to the straight leg length from equation 2.

$$w = 2r - \sqrt{((2r)^2 - t^2)} + l \quad (3)$$

Further optimization can be performed in the production of the fibers 100. There are three manufacturing operations that are performed on the raw wire. The wire 10 is flattened into a fiber 100 having a specific aspect ratio. In a separate operation, the fiber 100 is then twisted a specific number of times per unit length. Finally, the twisted fiber 100 is cut to an optimal length. The obvious way to perform these operations is separately. Each operation requires a significant piece of machinery. Raw material from each previous process would be stocked so as to keep each machine operating at maximum efficiency.

Examples

Described are examples of a specific geometries or configuration of fibers which can be considered individually or group in large numbers and blended more rapidly and thoroughly into all types of mixtures including concrete mixtures including but not limited to, precast products, mortar, grout, concrete, cast-in-place concrete, stucco and the like, all of which generally comprise hard cement-like materials. The terms concrete, concrete materials or concrete mixtures shall be employed herein with the understanding that all types of concrete products are included. The examples provided here are simply illustrations of individual or groups of fibers, matrixes and their properties, they are not intended to be, and should not be considered limiting in any way.

Example 1 provides a method of production where all three operations are combined into one operation so as to save in production cost and inventory carrying costs. Table 1 shows the estimated labor costs for producing the fiber 100 as 3 separate operations. Estimates are also given for required WIP inventory and their carrying costs.

TABLE 1

Value Stream Map of Separate machines Multi step Production

| Task | Labor Cost/ton | Carrying cost/ton | |
|---|---|---|---|
| receive Wire | $ 0.67 | $1.98 | |
| Test wire for tensile | $ 0.17 | $0.00 | |
| place OK sticker on wire | $ 0.06 | $0.00 | |
| Stage 3 pallets of wire | $ 0.43 | $0.28 | |
| Unwrap pallet | $ 0.77 | $0.00 | |
| Move spool to machine | $ 2.32 | $0.00 | |
| Spool change on machine | $ 23.20 | $0.01 | |
| Produce 1 spool of flattened wire | $ 0.00 | $0.01 | |
| Move finished spool to staging area | $ 2.32 | $0.28 | |
| Move finished spool to machine | $ 2.32 | $0.00 | |
| Spool change | $ 23.20 | $0.01 | |
| Produce 1 spool of twisted wire | $ 0.00 | $0.08 | |
| move spool to staging area | $ 2.32 | $0.28 | |
| Move finished spool to machine | $ 2.32 | $0.00 | |
| Spool change | $ 23.20 | $0.01 | |
| Cut wire to length | $ 0.00 | $0.01 | |
| Wire break | $ 9.29 | $0.01 | |
| Check quality | $ 34.28 | $0.00 | |
| Move boxes to packing station | $ 10.21 | $0.01 | |
| Pack boxes | $ 10.21 | $0.28 | |
| Load on truck | $ 0.65 | $0.00 | Total |
| total cost/ton | $147.95 | $3.24 | $151.19 |

Table 1 shows the estimated labor costs in dollars for producing short twisted fibers 100 having a bilateral truncated circle cross section made from 3 separate operations. Estimates are also given for required WIP (work in progress) inventory and their carrying costs.

Table 2 shows the same product as described in Table 1 only using a single step method of production.

Single step production

| Task | Labor cost/ton | Carrying cost/ton | |
|---|---|---|---|
| receive Wire | $ 0.67 | $1.98 | |
| Test wire for tensile | $ 0.17 | $0.00 | |
| place OK sticker on wire | $ 0.06 | $0.00 | |
| Stage 3 pallets of wire | $ 0.43 | $0.28 | |
| Unwrap pallet | $ 0.77 | $0.00 | |
| Move spool to machine | $ 2.32 | $0.00 | |
| Spool change on machine | $23.20 | $0.01 | |
| Produce 1 box of product | $ 0.00 | $0.08 | |
| Wire break | $ 6.64 | $0.01 | |
| Check quality | $34.28 | $0.00 | |
| Move boxes to packing station | $10.21 | $0.01 | |
| Pack boxes | $10.21 | $0.28 | |
| Load on truck | $ 0.65 | $0.00 | Total |
| Total cost/ton | $89.61 | $2.64 | $92.26 |

Single step vs multi step cost savings: 38.98%

Table 2 shows a similar estimate for the same final product in Table 1 only Table 2 shows the dollar amounts needed for a single machine operation. Table 2 shows the estimated labor costs for producing short twisted fibers having a bilateral truncated circle cross section with one continuous operation, as shown in FIG. 2. Estimates are also given for required WIP inventory and their carrying costs. When the three separate steps are combined it can reduce production costs by about 38%.

Figure 7:
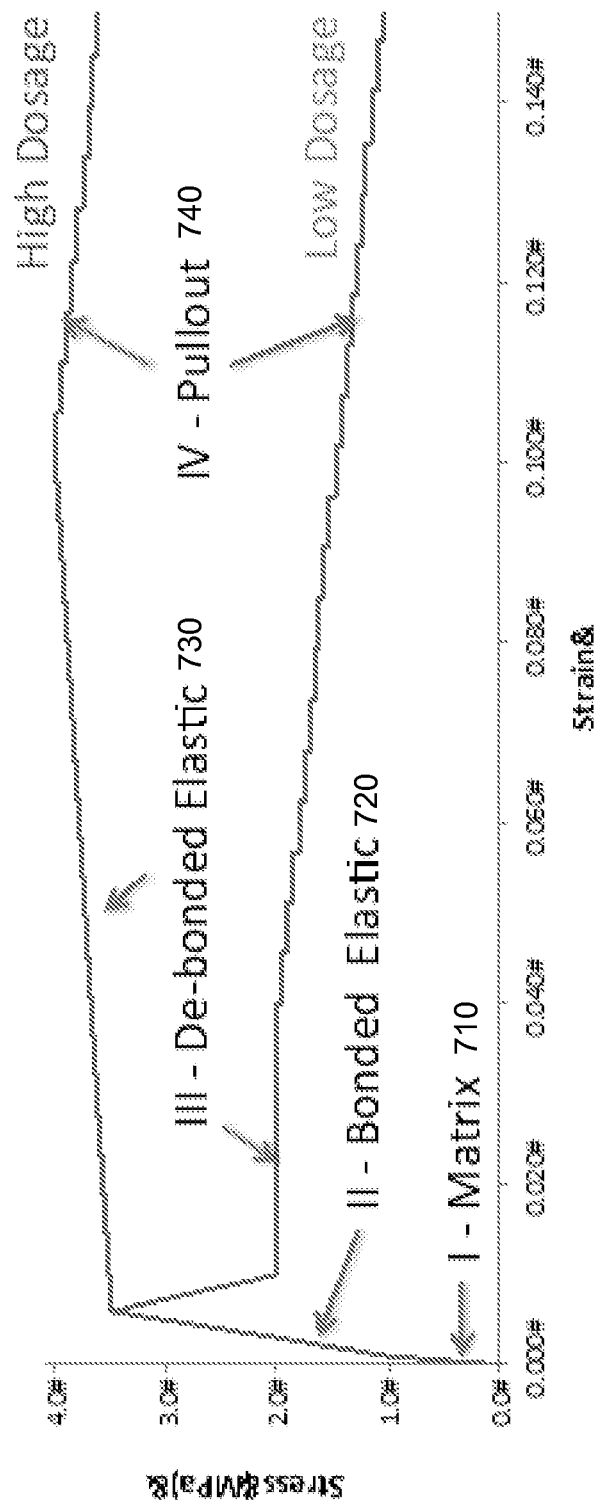
FIG. 7 is chart illustrating an exemplary stress versus strain curve.

Referring to FIG. 7, fiber performance can be described in terms of a multiphase approach. Concrete 200 (FIG. 9A) reinforced with fibers 100 goes may through four fundamentally different phases 710, 720, 730, 740 prior to failure in tension, each governed by a different behavior. The first phase 710 is matrix loading of the concrete 200. The concrete matrix 200 itself takes up the tensile load, which occurs until a first micro crack forms. After the first crack forms, the second phase 720 begins with the fibers 100 taking up the load, and causing additional micro-cracking to occur as the load is distributed between the pieces of fibers 100. The fibers 100 do not move relative to the concrete matrix 200 during this phase. The third phase 730 occurs as the fibers 100 begin to stretch, but before the ends begin to move. Depending on the dosage, multiple cracking or a single dominant crack forms during this phase. The fourth phase 740 begins when the ends begin to move relative to the concrete matrix 200. As strain increases during this phase, the load steps down as each fiber 100 pulls (untwists) out of the concrete matrix 200.

Figure 8:
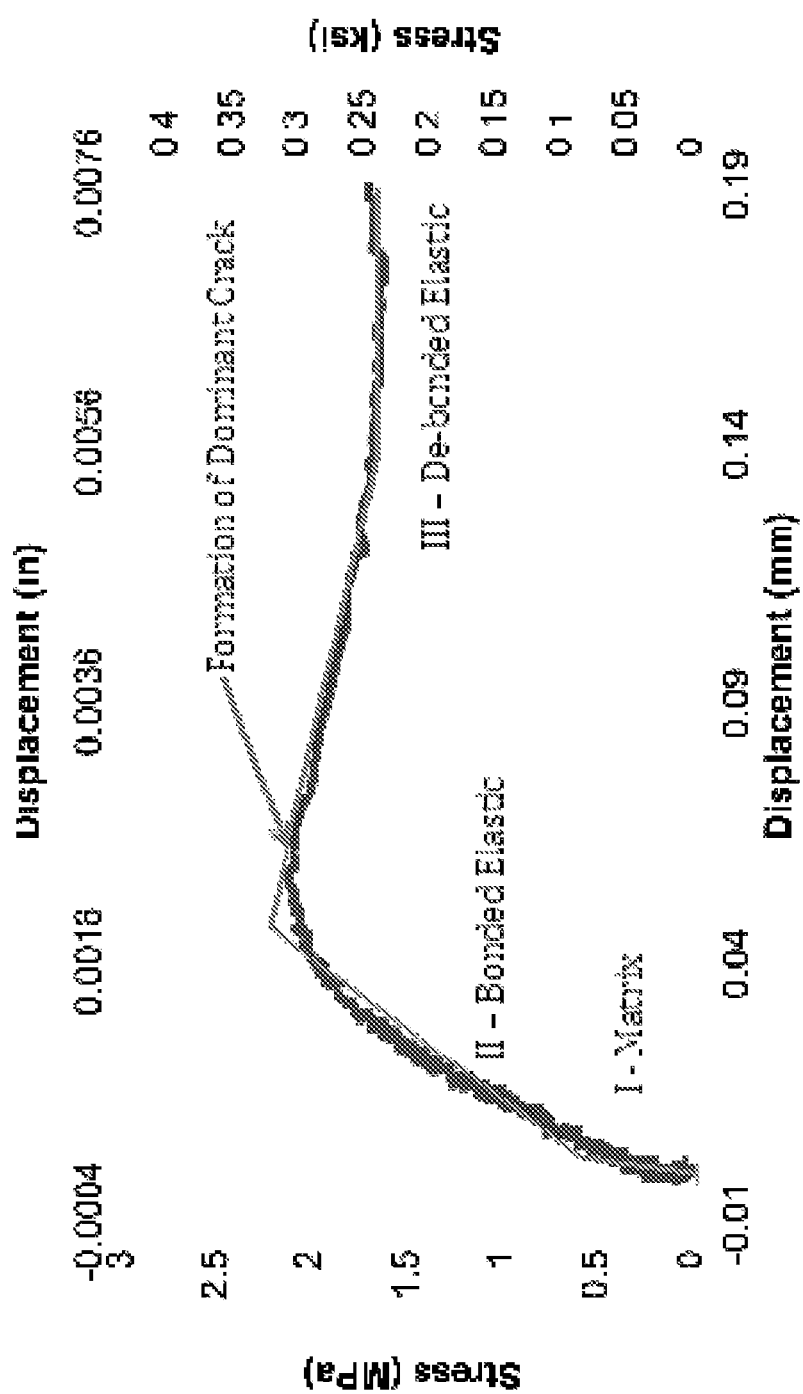
FIG. 8 is chart illustrating an exemplary stress versus displacement curve.

Matrix loading of the concrete occurs in the first phase 710. The load may increase sharply with minimal deflection. At an inflection point, the first micro-crack may occur. The micro-cracking occurs at a lower load and deflection than in unreinforced concrete 200, as illustrated in FIG. 8. The fibers 100 begin taking up load allowing larger deflection at this point. The physics of this region is linear elastic. As the load increases, there is an inflection point as the first micro-crack occurs and the matrix enters the second phase 720.

During the second phase 720, micro-cracking occurs through the concrete 200, but the fibers 100 are still fully bonded to the concrete 200. The fibers 100 take up the very small deflections as these cracks occur.

Figure 9A:
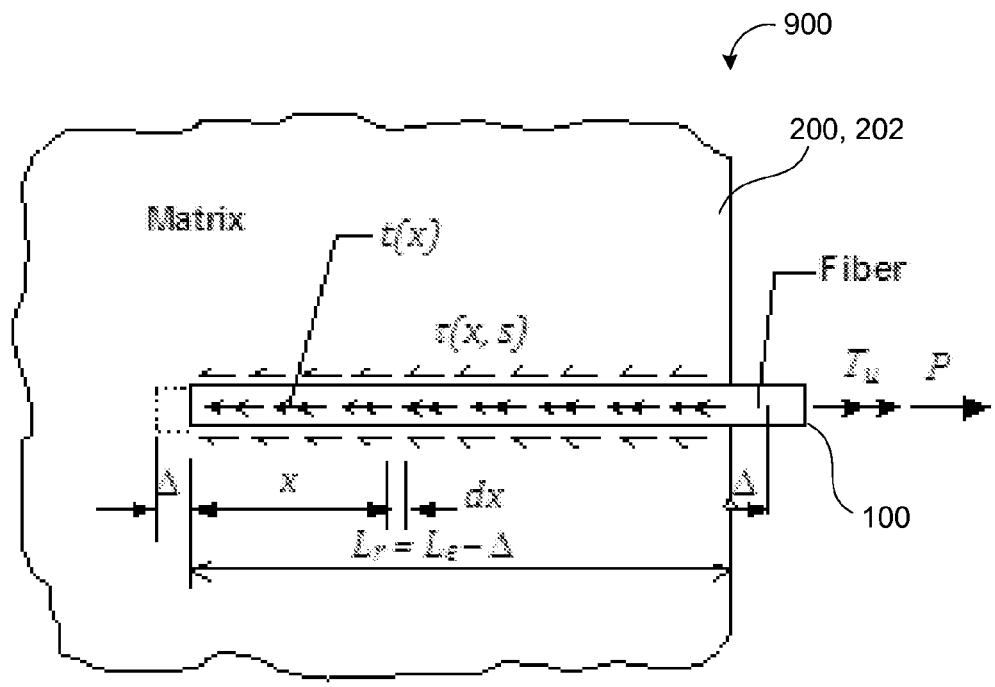
FIG. 9A is a section view of an exemplary matrix having a received reinforcing fiber.
Figure 9B:
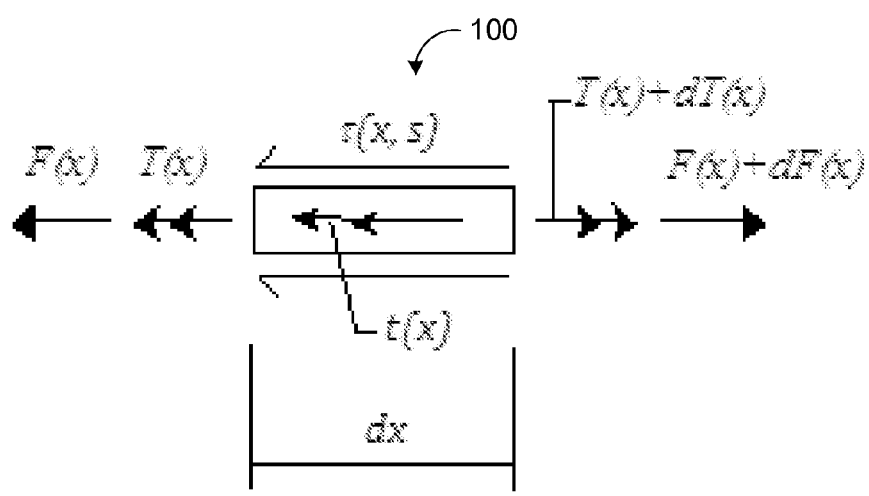
FIG. 9B is a section view of an exemplary fiber.
Figure 10:
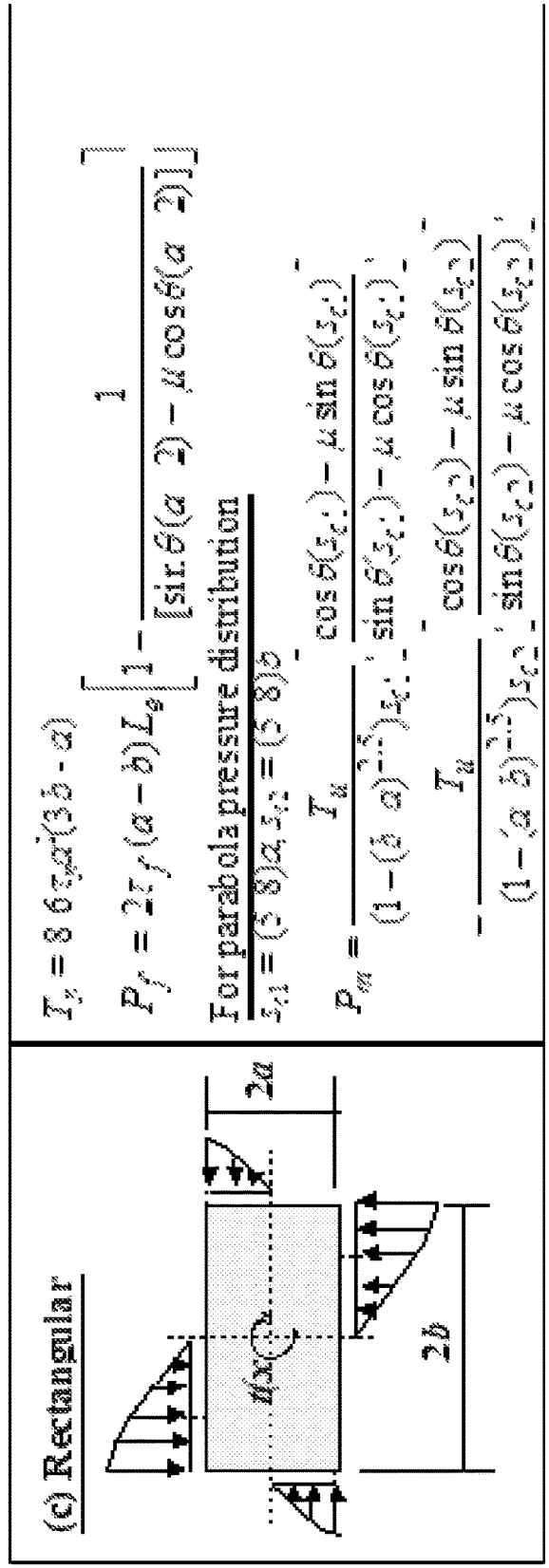
FIG. 10 is a section view of an exemplary fiber.

FIGS. 9A and 9B illustrate an exemplary model 900 of the physics behind the internal force equilibrium of the fiber reinforced concrete 200. The free body diagram can be solved to identify solutions for rectangular fibers 100. The forces incurred by pullout fibers 100 in the concrete 200 can be expressed as follows:

$$\frac{dF(x)}{dx} = \oint \tau(x, s) ds \qquad (4)$$

$$\frac{dT(x)}{dx} = t(x) \qquad (5)$$

Where F(x) and T(x) are local axial force and local torque, respectively, in the fibers 100 at a distance x from the embedded end of the fiber; τ(x, s) is transformed local bond shear stress at the fiber-matrix (concrete) interface; and t(x) is resistance torque distribution at the interface between the fibers 100 and the matrix 200. The solutions for rectangular fibers 100 are shown in FIG. 10. $P_f$ is the frictional resistance to pullout and $P_m$ is the mechanical (untwisting) resistance to pullout.

While there is considerable variation in the peak load due to inconsistencies in the concrete 200, the minimum load carried by the composite in the second phase 720 may be computed using the force equilibrium model. In the second phase 720, the static coefficient of friction between the fibers 100 and concrete 200 is high relative to the later phases. This increases the frictional bond $P_f$. The static coefficient of friction between steel and concrete is 0.43. An effective tensile resistance may be computed for the fibers 100 by substituting material properties and frictional/bond coefficients into the equation. As a result of the high bond to the concrete 200 (due to friction and bearing on the twisted shaped ribs), the fibers 100 develop 66% of their yield strength in the second phase 720. The ratio of fiber 100 bond strength to fiber 100 Tensile Strength is defined as $P_r$.

The random nature of the fiber distribution means that for any direction, the fibers 100 will have an average orientation of 45 degrees relative to the tensile force. The stress taken up by an individual fiber 100 is equal to the stress times the Cosine of 45 degrees (0.707). In other words, this is the percentage of fibers 100 active in tension ($P_a$). The position of the centroid of the fibers 100 relative to the crack is not important in this phase. A single dominate crack has not formed so all fibers 100 will participate in resisting and re-distributing loads regardless of position. This will not be true, however, in the third and fourth Phases 730, 740.

In the third phase 730 (de-bonded elastic—untwisting), the static coefficient of friction is overcome, the steel-concrete bond is broken and fibers 100 begin to untwist, although end movement has not yet occurred. The fibers 100 may be capable of stretching a maximum of 12%. Two factors contribute to this: 1) 6% elongation of the steel and 2) 6% elongation from the length (since decreases due to twisting during manufacturing). The shrinkage due to twisting can be explained using equation 6.

$$X = 1 - \cos\left(\text{atan}\left(\frac{n2\pi d}{l}\right)\right) \qquad (6)$$

Where n=number of full revolutions of the fiber 100, d=equivalent diameter of the wire, L=length of the fiber 100 and X=percentage reduction in length from twisting the fiber 100.

As stress levels increase, a combination of untwisting and elastic properties of the steel may allow for a minimum elastic response of 0.40 in. when low fiber dosages are applied. If the dosage is high, additional micro-cracks may form instead of a dominant crack allowing for more deflection without loss of capacity. If the dosage is low, the load may drop to a plateau that extends to at least 1-2 mm (0.040" to 0.080") crack width. Either way, stretching and untwisting of all fibers 100 increases until end movement begins across a dominant crack and the behavior is perfectly plastic or hardening.

In the third phase 730, a dominant crack forms. Solving the equation 7, the percentage of fibers 100 that are active in tension changes from 0.707 to 0.5.

$$\int_{z=0}^{L_f/2} [\int_{\phi=0}^{arccos(2z/L_f)} p(\phi) d\phi] p(z) dz \qquad (7)$$

De-bonding has also occurred, so the kinetic coefficient of friction governs the frictional bond strength. This is about half of the static coefficient of friction, 0.2 which decreases the frictional bond.

In the fourth phase 740 (pullout/untwisting), end movement occurs and the fibers 100 that bridge the dominant crack begin to pull out of the concrete matrix 200. Pull out continues to occur until the dominant crack size increases to approximately ¼ the length of the fiber 100 (e.g., 6 mm). As each fiber 100 pulls out, the load that can be withstood decreases in a step function. The Chuchai equilibrium model governs this performance, as illustrated in FIGS. 9A and 9B.

Using Newtons Laws (e.g., two equilibrium equations), the forces incurred by pullout fibers 100 from concrete 200 can be expressed using equations 4 and 5. As in the third phase 730, the percentage of fibers 100 that are active may be 50%.

In some implementations, a helix design for the fibers 100 can be made using a three step scaling process to develop a ratio of required rebar to required helix. Once this is known, a factor that may be multiplied by the required reinforcement ratio may be computed. The method can be expressed based on three ratios, as:

$$\frac{\lambda_{steel}}{P_a \times Y_r \times P_t} = R \qquad (8)$$

Where $P_a$ is the percentage of helix that is active, $Y_r$ is the ratio of Helix tensile strength to standard rebar 415 MPa (60,000 psi), $P_t$ is the percentage of the Helix ultimate tensile force that is taken up by each Helix and, $\lambda_{steel}$ is the density of steel R is the Helix reinforcement ratio multiplier.

The Helix reinforcement ratio multiplier, R, is used to compute the Helix dosage required to develop the same equivalent amount of tensile resistance provided by grade 60 rebar applied at a given reinforcement ratio. The reinforcement ratio may be a standard value computed as an intermediate step in determining rebar design by structural engineers. Equation 8 provides engineers with a simple way to compute Helix dosages based on their own calculations (Equation 9).

$$\rho_{As/Ac} \times R = Dosage \qquad (9)$$

Where P As/Ac is the reinforcement ratio, R is the Helix reinforcement ratio multiplier and, Dosage is the Helix dosage in kg/m3 (lb/yd).

While the factor $Y_r$ remains constant relative to the application, the factors $P_a$ and $P_t$ are dependent on the support conditions (how much deflection is expected). Standard LRFD reliability theory may be employed to ensure a safe design based on the consequence of failure. For those engineers wishing design with the first principles, the direct tensile stress may be computed using R using equation 10.

$$\sigma = \frac{Dosage \times F_y}{R} \qquad (10)$$

Where σ is the tensile stress of the Helix Composite, Dosage is the Helix dosage in kg/m³ (lb/yd), Fy is the tensile strength of standard rebar 415 MPa (60,000 psi) and, R is the Helix reinforcement ratio multiplier.

Depending on the class of a structure being designed, the required dosage may be further modified by a resistance factor to account for uncertainty in mix design and reinforcement performance. This resistance factor is calculated below in equation 11.

$$\phi = \left(\frac{\bar{R}}{R_n}\right) e^{-0.75 \beta V_R} \qquad (11)$$

Where $R^{bar}$ is the mean response (from test results), $R_n$ is the nominal response (computed using the model), β is the beta factor defining the acceptable probability of failure and $V_r$ is coefficient of variation of the response (from test results).

Four "Concrete-Steel Composite Classes" A, B, C and D may be designed:

Concrete-Steel Composite Classes A: Fully Supported Slabs

Examples

Slab on Grade
Slab on Metal Deck
Pavements
Sidewalks
Precast tank bottoms
Design: Phase II
Reliability: 2.27% probability of cracking (13=2), 0% probability of collapse Concrete-Steel Composite Classes B: Vertical Structures in Compression and Foundations:

Examples

Interior Partition Walls
One and two story exterior walls with less than 1.5 kPa (30 psf) wind pressure or 130 Kilometers/hour (85 MPH) or less
Retaining walls with less than 4 feet backfill
Precast tank side walls
Strip Footings
Piers
Mat Foundations
Design: Phase II
Reliability: 0.14% probability of cracking (β=3), 0% probability of collapse.

Concrete-Steel Composite Classes C: Vertical Structures in Flexure and Reverse Loading:

Examples

Exterior walls with more than 1.5 kPa (30 psf) wind pressure or 130 kilometers/hour (85 MPH)
Shear Walls Columns
Piers
Caissons
Design: Transition from Phase II to Phase III
Reliability: 0.01% probability of collapse (β=3.5)
Concrete-Steel Composite Classes D: Suspended Structures:

Examples

One Way Slab
Two Way Slab
Beams
Precast tank tops
Design: Phase III
Crack Width Check: Required
Reliability: 0.0032% probability of collapse (β=4)

A number of implementations have been described. Nevertheless, it will be understood that various modifications may be made without departing from the spirit and scope of the disclosure. Accordingly, other implementations are within the scope of the following claims.

What is claimed is:

1. A reinforcing fiber comprising:
a body defining a longitudinal axis and having a cross section in the shape of a bilateral truncated circle, wherein the bilateral truncated circle has an aspect ratio between 1.53 and 1.93, wherein the aspect ratio is a ratio of width (w) to thickness (t) of the body,
wherein the body is twisted along its longitudinal axis;
wherein the body has a width (w) of between 0.01375 inches and 0.0159 inches.

2. The reinforcing fiber of claim 1, wherein the body comprises a metal.

3. The reinforcing fiber of claim 1, wherein the aspect ratio is 1.72 or 1.73.

4. The reinforcing fiber of claim 1, wherein the aspect ratio is selected from the group consisting of the following ranges and values:
1.53-1.88; 1.53-1.83; 1.53-1.78; 1.53-1.73, 1.53-1.68, 1.53-1.63; 1.53-1.58; about 1.53; 1.58-1.93; 1.58-1.88; 1.58-1.83; 1.58-1.78; 1.58-1.73; 1.58-1.68; 1.58-1.63; 1.58-1.53; about 1.58; 1.63-1.93; 1.63-1.88; 1.63-1.83; 1.63-1.78; 1.63-1.73; 1.63-1.68; 1.63-1.58; 1.63-1.53; about 1.63; 1.68-1.93; 1.68-1.88; 1.68-1.83; 1.68-1.78; 1.68-1.73; 1.68-1.63; 1.68-1.58; 1.68-1.53; about 1.68; 1.73-1.93; 1.73-1.88; 1.73-1.83; 1.73-1.78; 1.73-1.68; 1.73-1.63: 1.73-1.58; 1.73-1.53; about 1.73); 1.78-1.93; 1.78-1.88; 1.78-1.83; 1.78-1.73; 1.78-1.68; 1.78-1.63; 1.78-1.58; 1.78-1.53; about 1.78; 1.83-1.93; 1.83-1.88; 1.83-1.78; 1.83-1.73; 1.83-1.68; 1.83-1.63; 1.83-1.58; 1.83-1.53; about 1.88; 1.88-1.93; 1.88-1.83; 1.88-1.78; 1.88-1.73; 1.88-1.68; 1.88-1.63; 1.88-1.58; 1.88-1.53; about 1.88; and about 1.93.

5. The reinforcing fiber of claim 1, wherein the body has a between 3 and 4 twists along its longitudinal axis per every length (L) of between 20 mm and 40 mm.

6. The reinforcing fiber of claim 5, wherein each twist comprises a rotation a first end of the body relative to a second end of the body of between 180° and 360°.

7. The reinforcing fiber of claim 1, wherein the fiber is made by the method of passing a round wire through roller bearings under sufficient force to produce a fiber defining a bilateral truncated circle cross sectional shape.

8. The reinforcing fiber of claim 7, wherein the method further comprising simultaneously pulling and twisting the fiber a threshold number of twists per inch while retaining the aspect ratio.

9. The reinforcing fiber of claim 7, wherein the wire has a diameter of 0.51 mm.

10. A method of making a reinforcing fiber, the method comprising the steps of:
continuously receiving a round wire;
forming the round wire into a fiber having to have a cross-sectional shape defining a bitruncated circle having an aspect ratio of between 1.53 and 1.93, wherein the aspect ratio is a ratio of width (w) to thickness (t) of the fiber, wherein the body has a width (w) of between 0.01375 inches and 0.0159 inches; and
simultaneously pulling and twisting the fiber a threshold number of twists per inch while retaining the aspect ratio of the fiber.

11. The method of claim 10, further comprising the step of twisting the fiber between 3 and 4 twists along its longitudinal axis per every length (L) of between 20 mm and 40 mm.

12. The method of claim 11, further comprising the step of rotating a first end of a body of the fiber relative to a second end of the body of between 180° and 360° for each twist.

13. The method of claim 10, further comprising the step of cutting the twisted fiber to a threshold length (L) free of holding the twisted fiber.

14. The method of claim 13, further comprising the step of receiving and cutting the twisted fiber to a threshold length (L) while retaining the aspect ratio of the fiber.

15. The method of claim 13, wherein the threshold length (L) comprises between 20 mm and 40 mm.

16. A composite structure comprising:
a matrix material; and
a fiber comprising a body defining a longitudinal axis and having a cross section in the shape of a bitruncated circle, wherein the truncated circle has an aspect ratio between 1.53 and 1.93, wherein the aspect ratio is a ratio of width (w) to thickness (t) of the body, wherein the body has a width (w) of between 0.01375 inches and 0.0159 inches;
wherein the body is twisted along its longitudinal axis.

17. The composite structure of claim 16, wherein the body (110) comprises metal, preferably steel.

18. The composite structure of claim 16, wherein the aspect ratio is 1.72 or 1.73.

19. The composite structure of claim 16, wherein the aspect ratio is selected from the group consisting of the following ranges and values:
1.53-1.88; 1.53-1.83; 1.53-1.78; 1.53-1.73, 1.53-1.68, 1.53-1.63; 1.53-1.58; about 1.53; 1.58-1.93; 1.58-1.88; 1.58-1.83; 1.58-1.78; 1.58-1.73; 1.58-1.68; 1.58-1.63; 1.58-1.53; about 1.58; 1.63-1.93; 1.63-1.88; 1.63-1.83; 1.63-1.78; 1.63-1.73; 1.63-1.68; 1.63-1.58; 1.63-1.53; about 1.63; 1.68-1.93; 1.68-1.88; 1.68-1.83; 1.68-1.78; 1.68-1.73; 1.68-1.63; 1.68-1.58; 1.68-1.53; about 1.68; 1.73-1.93; 1.73-1.88; 1.73-1.83; 1.73-1.78; 1.73-1.68; 1.73-1.63: 1.73-1.58; 1.73-1.53; about 1.73); 1.78-1.93; 1.78-1.88; 1.78-1.83; 1.78-1.73; 1.78-1.68; 1.78-1.63; 1.78-1.58; 1.78-1.53; about 1.78; 1.83-1.93; 1.83-1.88; 1.83-1.78; 1.83-1.73; 1.83-1.68; 1.83-1.63; 1.83-1.58; 1.83-1.53; about 1.88; 1.88-1.93; 1.88-1.83; 1.88-1.78; 1.88-1.73; 1.88-1.68; 1.88-1.63; 1.88-1.58; 1.88-1.53; about 1.88; and about 1.93.

20. The composite structure of claim 16, wherein the body has between 3 and 4 twists along its longitudinal axis per every length (L) of between 20 mm and 40 mm.

21. The composite structure of claim 20, wherein each twist comprises a rotation a first end of the body relative to a second end of the body of between 180° and 360°.

22. The composite structure of claim 16, wherein the matrix material comprises cement or a polymeric based material.

* * * * *

UNITED STATES PATENT AND TRADEMARK OFFICE
CERTIFICATE OF CORRECTION

Page 1 of 1

PATENT NO. : 10,266,970 B2
APPLICATION NO. : 14/390270
DATED : April 23, 2019
INVENTOR(S) : Luke Pinkerton and Joseph L. Stecher It is certified that error appears in the above-identified patent and that said Letters Patent is hereby corrected as shown below:

In the Specification

In Column 3, Line 15 delete "width" and replace with "thickness"

In Column 3, Line 51 delete "width" and replace with "thickness"

In Column 5, Line 2 delete "width" and replace with "thickness"

In Column 5, Line 3 delete "thickness t" and replace with "width w"

In Column 5, Line 4 delete "width w" and replace with "thickness t"

In the Claims

In Column 13, Line 32 delete "width (w)" and replace with "thickness (t)"

In Column 14, Line 14 delete "width (w)" and replace with "thickness (t)"

In Column 14, Line 42 delete "width (w)" and replace with "thickness (t)"

Signed and Sealed this
Thirteenth Day of August, 2019

Andrei Iancu
*Director of the United States Patent and Trademark Office*